US006980995B2

(12) United States Patent
Charlet et al.

(10) Patent No.: US 6,980,995 B2
(45) Date of Patent: Dec. 27, 2005

(54) METHOD, COMPUTER PROGRAM PRODUCT, AND SYSTEM FOR AUTOMATICALLY GENERATING A HIERARCHIAL DATABASE SCHEMA REPORT TO FACILITATE WRITING APPLICATION CODE FOR ACCESSING HIERARCHIAL DATABASES

(75) Inventors: Kyle Jeffrey Charlet, Morgan Hill, CA (US); Douglas Michael Frederick Hembry, Los Gatos, CA (US); Christopher M. Holtz, San Jose, CA (US); Robert Daniel Love, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 10/201,879

(22) Filed: Jul. 23, 2002

(65) Prior Publication Data

US 2004/0019600 A1 Jan. 29, 2004

(51) Int. Cl.[7] ........................ G06F 17/30

(52) U.S. Cl. ........................ 707/102; 707/2; 707/4; 707/5; 707/101; 707/102; 707/103; 707/104

(58) Field of Search ........................ 707/1, 2, 3, 4, 707/10, 100, 101, 102, 103 R, 104.1, 202, 6, 200; 709/223, 201, 203, 207, 219, 220, 226, 228, 231; 705/2, 7, 14

(56) References Cited

U.S. PATENT DOCUMENTS

| | | | | |
|---|---|---|---|---|
| 4,873,625 A | * 10/1989 | Archer et al. | 707/7 |
| 5,737,597 A | 4/1998 | Blackman et al. | 395/613 |
| 5,799,313 A | 8/1998 | Blackman et al. | 707/103 R |
| 5,924,101 A | 7/1999 | Bach et al. | 707/103 R |
| 6,026,408 A | 2/2000 | Srinivasan et al. | 707/103 |

(Continued)

FOREIGN PATENT DOCUMENTS

EP 1122653 A2 10/1993 ........... G06F/17/30

OTHER PUBLICATIONS

Atkinson et al, Types and Persistence in Database Programming Languages, ACM Computing Surveys, vol. 19, No. 2, Jun. 1987, p. 105–190.*

Dave Mendien, Database Diagramming with Visual Studio 6.0 and SQL Server 7.0, Visaul studi, Nov. 1998.*

IMS Java User's Guide, International Business Machines Corp., 2nd, Edition, SC27–0832–01, Jun. 2001.*

Navathe. S.B; "Schema Analysis for Database Restructuring", *ACM Transactions on Database Systems*, vol. 5, No. 2, (Jun. 1980), pp. 157–184.

Kearney, J., "Executing IMS transactions from OS/390 Java applications through the Java–OTMA package"Developer Toolbox Technical Magazine, Jan. 2001. http://www.6.software.ibm.com/devcon/devcon/docs/new0101c.htm.

Yu, C., "Using Informix JDBC Driver in VisualAge for Java"http://www.7b.boulder.ibm.com/wsdd/library/techarticles/0201 yu/yu.html.

(Continued)

*Primary Examiner*—Shahid Alam
*Assistant Examiner*—Fred I. Ehichioya
(74) *Attorney, Agent, or Firm*—Kunzler & Associates

(57) ABSTRACT

A database definition, logical database view, extended field definition and control statement information are accessed to build an in-memory representation of selective information contained therein. Utilizing this in-memory representation, a hierarchical database schema report is automatically generated wherein this hierarchical database schema report may be used to write application code to access the hierarchical database without further need to utilize the database definition, the extended field definition, the logical database view or any combination thereof.

36 Claims, 15 Drawing Sheets

U.S. PATENT DOCUMENTS

| | | | | | |
|---|---|---|---|---|---|
| 6,044,217 | A | | 3/2000 | Brealey et al. | 395/701 |
| 6,049,655 | A | | 4/2000 | Vazirani | 717/108 |
| 6,085,188 | A | | 7/2000 | Bachmann et al. | 707/3 |
| 6,085,198 | A | | 7/2000 | Skinner et al. | 707/103 |
| 6,128,611 | A | | 10/2000 | Doan et al. | 707/4 |
| 6,202,069 | B1 | | 3/2001 | Blackman et al. | 707/103 |
| 6,236,994 | B1 | | 5/2001 | Swartz et al. | 707/6 |
| 6,341,288 | B1 | * | 1/2002 | Yach et al. | 707/103 R |
| 6,345,256 | B1 | | 2/2002 | Milsted et al. | 705/1 |
| 6,529,914 | B1 | | 3/2003 | Doan et al. | 707/103 Y |
| 6,665,677 | B1 | * | 12/2003 | Wotring et al. | 707/100 |
| 6,754,671 | B2 | * | 6/2004 | Hrebejk et al. | 707/103 R |
| 6,845,376 | B1 | | 1/2005 | Johnson | 707/100 |
| 2001/0016843 | A1 | | 8/2001 | Olson et al. | 707/3 |
| 2002/0029375 | A1 | | 3/2002 | Mlynarczyk et al. | 717/108 |
| 2002/0038335 | A1 | | 3/2002 | Dong et al. | 709/203 |
| 2002/0038450 | A1 | | 3/2002 | Kloppmann et al. | 717/102 |

OTHER PUBLICATIONS

Beauvoir, P., "Implementing IMS Metadata 1.1 Specifications as a Preliminary to Implementing Content Packaging 1.0 Specifications in Colloquia"http://toomol.bangor.ac.uk/co3/docments/metadataimplementation.html.

"JDBC –Java Access to SQL Databases"http://mindprod-.com/jdbc.html.

"IMS Java User's Guide,"International Business Machines Corp., 2[nd]Edition, SC27–0832–01, Jun. 2001.

Soltani, D., Heuer Hasenpatt, H., "Technology of host–based applications systems in a CORBA supported C environment,"*Proceedings of OOP '97. Objekt orientiertes Programmieren*, Muchen, Germany, Feb. 3–7, 1997, pp. 101–109.

M. Mehdi Owrang O., "A universal hierarchical language interface for IMS,"*Proceedings of Focus on Software*, Atlanta, GA, Feb. 1988, pp. 644–51.

Hill, J. E. et al., "Communication and Interaction Objects for Connecting an Application to a Database Management System,"IBM Santa Teresa Lab, Infogate article 13 of 484, Dec. 2000 (Abstract only).

Shelton, J. R. et al., "An Object–oriented Paradigm for Accessing System Service Requests by Modeling System Service Calls into an Object Framework,"IBM Santa Teresa Lab, Inforgate article 1 of 56, Dec. 2000. (Abstract only).

Atkinson et al., "Types and Persistence in Database Programming Languages."*ACM Computing Surveys*, vol. 19, No. 2, Jun. 1987, pp. 105–190.

Mendien, Dave, "Database Diagramming with Visual Studio 6.0 and SQL Server 7.0,"Visual Studi, Nov. 1998.

* cited by examiner

```
DBD NAME=DEALERDB,ACCESS=(HDAM,OSAM),RMNAME=(DFSHDC40.1.10)
    SEGM NAME=DEALER,PARENT=0,BYTES=94
    FIELD NAME=(DLRNO,SEQ,U),BYTES=4,START=1,TYPE=C
    FIELD NAME=DLRNAME,BYTES=30,START=5,TYPE=C
    SEGM NAME=MODEL,PARENT=DEALER,BYTES=43
    FIELD NAME=(MODTYPE,SEQ,U),BYTES=2,START=1,TYPE=C
    FIELD NAME=MAKE,BYTES=10,START=3,TYPE=C
    SEGM NAME=ORDER,PARENT=MODEL,BYTES=127
    FIELD NAME=(ORDNBR,SEQ,U),BYTES=6,START=1,TYPE=C
    FIELD NAME=LASTNME,BYTES=25,START=50,TYPE=C
    SEGM NAME=SALES,PARENT=MODEL,BYTES=113
    FIELD NAME=(SALDATE,SEQ,U),BYTES=8,START=1,TYPE=C
    FIELD NAME=LASTNME,BYTES=25,START=9,TYPE=C
    FIELD NAME=FIRSTNME,BYTES=25,START=34,TYPE=C
    SEGM NAME=STOCK,PARENT=MODEL,BYTES=62
    FIELD NAME=(STKVIN,SEQ,U),BYTES=20,START=1,TYPE=C
    FIELD NAME=PRICE,BYTES=5,START=47,TYPE=C
    DBDGEN
    FINISH
    END
```

```
DLR_PCB1  PCB
TYPE=DB,DBDNAME=DEALERDB,PROCOPT=GO,KEYLEN=42
     SENSEG  NAME=DEALER,PARENT=0
     SENSEG  NAME=MODEL,PARENT=DEALER
     SENSEG  NAME=ORDER,PARENT=MODEL
     SENSEG  NAME=SALES,PARENT=MODEL
     SENSEG  NAME=STOCK,PARENT=MODEL
     PSBGEN  PSBNAME=DLR_PSB,MAXQ=200
     END
```

Figure 5

```
OPTIONS
      PSBds=proto.type.input DBDds=proto.type.input
    GenJavaSource=YES
    gentrace=yes
    genXMI=yes
    outpath=gen
      Package=com.ibm.ims.tooling

PSB psbName=DLR_PSB JavaName=DealerDatabaseView
PCB PCBName=DLR_PCB1 JavaName=DealershipDB
Include Dataset=protoIncludes/cntrstmt2
```

```
SEGM DBDName=DEALERDB SegmentName=DEALER JavaName=DealerSeg
FIELD Start=1 Bytes=4 Name=DLRNC JavaName=DealerNumber JavaType=CHAR
FIELD JavaName=DealerName Bytes=30 Start=5 JavaType=CHAR
FIELD JavaName=YTDSales JavaType=PACKEDDECIMAL TypeQualifier=S9(18)
     Start=85 Bytes=10

SEGM DBDName=DEALERDB SegmentName=MODEL JavaName=ModelSeg
FIELD Start=1 Bytes=2 Name=MODTYPE JavaName=ModelTypeCode JavaType=CHAR
FIELD Start=3 Bytes=10 Name=MAKE JavaName=CarMake JavaType=CHAR
FIELD JavaName=EPAHighwayMilage JavaType=CHAR Start=36 Bytes=4
FIELD JavaName=Horsepower JavaType=CHAR Start=40 Bytes=4


SEGM DBDName=DEALERDB SegmentName=ORDER JavaName=OrderSeg
FIELD Start=1 Bytes=6 Name=ORDNBR JavaName=OrderNumber
         JavaType=CHAR
FIELD JavaName=Price JavaType=ZONEDDECIMAL TypeQualifier=99999
         Start=37 Bytes=5
FIELD JavaName=OrderDate JavaType=CHAR Start=42 Bytes=8
FIELD Start=50 Bytes=25 Name=LASTNME JavaName=PurchaserLastName
         JavaType=CHAR
FIELD JavaName=DeliverDate JavaType=CHAR Start=120 Bytes=8
SEGM DBDName=DEALERDB SegmentName=SALES JavaName=SalesSeg
FIELD Start=1 Bytes=8 Name=SALDATE JavaName=DateSold
         JavaType=CHAR
FIELD Start=9 Bytes=25 Name=LASTNME JavaName=PurchaserLastName
         JavaType=CHAR
FIELD Start=34 Bytes=25 Name=FIRSTNME JavaName=PurchaserFirstName
         JavaType=CHAR
FIELD JavaName=SoldBy JavaType=CHAR Start=84 Bytes=10
```

```
          Hierarchical Database Schema Report
1505      ========================
          PSB:  DLR_PSB
1510      ================================================
          PCB:  DealershipDB
1520      ================================================
1521      Segment:  DealerSeg
1522      Field:  DealerNumber Type=CHAR Start=1 Length=4     ++Primary Key Field ++
1523      Field:  DealerName Type=CHAR Start=5 Length=30         (Search Field)
          Field:  YTDSales Type=PACKEDDECIMAL Type Qualifier= S9(18)Start=85 Length=10
1530      ===============================================
          Segment:  ModelSeg
          Field:  ModelTypeCode Type=CHAR Start=1 Length=2     ++Primary Key Field ++
          Field:  CarMake Type=CHAR Start=3 Length=10              (Search Field)
          Field:  EPAHighwayMilage Type=CHAR Start=36 Length=4
          Field:  Horsepower Type=CHAR Start=40 Length=4
1540      ==============================================
          Segment:  OrderSeg
          Field:  OrderNumber Type=CHAR Start=1 Length=6             ++Primary Key Field ++
          Field:  PurchaserLastName Type=CHAR Start=50 Length=25      (Search Field)
          Field:  Price Type=ZONEDDECIMAL Type Qualifier=99999 Start=37 Length=5
          Field:  OrderDate Type=CHAR Start=42 Length=8
          Field:  DeliverDate Type=CHAR Start=120 Length=8
1550      =============================================
          Segment:  SalesSeg
          Field:  DateSold Type=CHAR Start=1 Length=8                ++Primary Key Field ++
          Field:  PurchaserLastName Type=CHAR Start=9 Length=25       (Search Field)
          Field:  PurchasetFirstName Type=CHAR Start=34 Length=25     (Search Field)
          Field:  SoldBy Type=CHAR Start=84 Length=10
1560      =============================================
          Segment:  STOCK
          Field:  STKVIN Type=CHAR Start=1 Length=20                 ++Primary Key Field ++
          Field:  Price Type=CHAR Start=47 Length=5                   (Search Field)
```

METHOD, COMPUTER PROGRAM PRODUCT, AND SYSTEM FOR AUTOMATICALLY GENERATING A HIERARCHIAL DATABASE SCHEMA REPORT TO FACILITATE WRITING APPLICATION CODE FOR ACCESSING HIERARCHIAL DATABASES

CROSS-REFERENCE TO RELATED APPLICATIONS

This application is related to the following commonly assigned patent application:

The application, entitled "METHOD, COMPUTER PROGRAM PRODUCT, AND SYSTEM FOR AUTOMATIC CLASS GENERATION WITH SIMULTANEOUS CUSTOMIZATION AND INTERCHANGE CAPABILITY", filed on Jun. 14, 2002 by Hembry et al., Ser. No. 10/173,521 is incorporated by reference herein. This application will be hereinafter referred to as the "Automatic Class Generation" application.

FIELD OF INVENTION

The present invention relates generally to accessing databases, and in particular, to writing application code to access one or more hierarchical databases.

BACKGROUND

Hierarchical databases, such as IBM's IMS (Information Management System), are well known in the art. (IMS is a trademark of International Business Machines Corporation in the United States, other countries, or both.) IMS is a hierarchical database management system (HDBMS) with wide spread usage in many large enterprises where high transaction volume, reliability, availability and scalability are of the utmost importance. IMS provides software and interfaces for running the businesses of many of the world's largest corporations. However, companies incorporating LMS databases into their business models typically make significant investments in IMS application programs in order to have IMS perform meaningful data processing particularly tailored to the needs of their respective enterprises. IMS application programs are typically coded in COBOL, PL/I, C, PASCAL, Assembly Language, or Java and are created by programmers with critical skill sets in a programming environment that may be time consuming, inefficient and error prone. (Java is a trademark of Sun Microsystems, Inc. in the United States and/or other countries.)

Physical IMS databases are hierarchic. Each database has a schema defined as a hierarchy or tree of segment types, each of which is defined, in turn, as a collection of fields. This definition of a physical database schema is contained in an IMS control block called a "Database Description" (DBD). A physical IMS database is a simple hierarchy, but multiple physical databases (i.e., hierarchies), may be linked by one or more associations called "logical relationships" which allow new "logical hierarchies" to he defined. A logical hierarchy typically traverses multiple physical hierarchies by crossing one or more logical relationships, and incorporates segments from several databases. Logical hierarchies are defined in "Logical Database Descriptions" (Logical DBDs), and may he processed, for the most part, as if they were simple physical databases. They are somewhat analogous to relational database "views" that are defined on joins of a number of database tables. In addition, "secondary indexes" may be defined for a database, which provide alternate search paths to any segment type in the database hierarchy (logical or physical), and affect the application's view of its data.

Each IMS application program is defined to process one or more physical DBDs or logical DBDs. This definition is contained in another IMS control block called a Program Specification Block (PSB). For each DBD that the program processes, the PSB specifies the subset of the DBD hierarchy that the application is authorized to process, and optionally its authorized level of processing (e.g., Get, Replace, Insert, Delete) for each segment in the subset. This information for each DBD is contained is a structure called a "Program Control Block" (PCB) within the PSB. If the application processes more than one database hierarchy (logical or physical) there will be multiple PCBs in its PSB.

To write an application program, the application developer must understand the application's view of its databases. Access to a database from an IMS application program is performed by calling the IMS call interface and specifying which PCB (i.e., which hierarchy) the call is intended to operate on. The IMS interface defines a number of operations to search and navigate through a hierarchy, and to update, insert and delete segments. The call also specifies the target segment or segments and search arguments that specify positioning in the hierarchy. Search arguments typically contain field name/value pairs or the target segments.

To code the database calls in the application program, the developer needs to know:

- The names of the database segments in the hierarchy
- The hierarchic relationship of the segments to each other
- The fields in each segment, their positions and lengths
- Which fields are search, or indexed, fields
- The data types of the fields
- If the application processes multiple hierarchies (i.e., multiple data PCBs in the application's PSB), then this information is repeated for each PCB.

Traditionally, when coding an application, the developer gets this information by referring to the source copies of the PSB and DBDs, which are in the form of Assembler Language macros. The PSB source contains macros for each PCB, which names the database (logical or physical). Each PCB contains macros for the segments in that PCB which specify the hierarchic arrangement of the segments, but additional details of each segment and its fields must be obtained from the DBD source. The application developer locates the corresponding source file for that DBD from the DBD name in the PCB The segment macros in the PCB also name then corresponding segment in the DBD's hierarchy, so the developer can locate segment definitions in the DBD. Segment definitions in physical DBD hierarchies contain macros describing at least some of the fields in the segment, with their lengths and offsets. A parameter on the field macro gives an indication of the data type of the field.

If the PCB refers to a logical hierarchy there is another level of indirection. The segment macros in the logical DBDs d(o not contain information on length, offset, and type, but rather refer by name to segment macros in one or more physical DBDs. Thus the developer must follow the name links to the physical DBDs to obtain the needed information.

Another complication arises in that DBDs generally do not contain information about all the fields in a segment. Typically, field macros are only included in physical DBDs for fields that can be used as "search fields" when accessing the database. These are fields that may be referenced in "segment search arguments" of database calls. If the application needs to process other fields in the segments (as it generally will need to do) the developer must get the information from some other source. Often, layouts of fields within segments can be captured from language structures of existing applications, such as COBOL copybooks, and can be included into new application programs.

The net result of all this is that in order to get a complete picture of the data, application developers must refer to and merge information from several sources: the PSB, possibly one or more logical DBDs, physical DBDs, and existing language source for the segments being processed. This process is skill intensive, complex and error prone, especially for large databases with logical relationships.

IMS applications written in the Java language involve even more complexities. IMS Java applications access IMS databases using a limited subset of the SQL92 query language and JDBC (Java Database Connectivity), the standard Java APIs for accessing relational databases. This contrasts with applications written in other languages, which must use the IMS defined call interface. When coding an IMS Java application, the application developer needs all the same information listed above for developers in other languages. In addition, however IMS Java allows an application to refer to PSBs, PCBs, Segments, and Fields, using Java-style identifiers rather than the 8-character names used by the PSB, PCB, Segment and Field, macros. The developer must know these Java alias names for each entity. IMS Java presents data to the application using the broad range of standard JDBC data types, and to process a field the developer must also know its JDBC data type.

Neither the Java-style aliases nor the JDBC data type are present in the PSB or DBD. For its internal operation IMS Java requires a "metadata class" to be created by the Java programmer which summarizes all of the information about database hierarchies, segments and fields normally found in the PSB, DBDs, as well as the Java alias names and data types, and details of additional fields (not defined in the DBD).

A developer of an IMS Java application could in theory use this metadata class (or its java source file) as a comprehensive reference source for understanding the data view of the application. However, this metadata class is optimized in its organization for consumption by the IMS Java system code and, accordingly, is greatly lacking in its suitability for use by a human developer.

Accordingly, there is a great need for an automated and integrative approach to collecting pertinent information from disparate sources and presenting the information to an application programmer in a form suitable for humans and conducive to efficient development of application source code for accessing hierarchical databases. Furthermore, this information should be comprehensive to the extent that it obviates the need to consult any other database source materials for information required to build the hierarchical database access code.

SUMMARY OF THE INVENTION

To overcome these limitations in the prior art briefly described above, the present invention provides a method, program product and apparatus for automatically generating a hierarchical database schema report to facilitate writing application code for accessing a hierarchical database. A database definition, logical database view, extended field definition and control statement information are accessed to build an in-memory representation of selective information contained therein. Utilizing this in-memory representation, a hierarchical database schema report is automatically generated wherein this hierarchical database schema report may be used to write application code to access the hierarchical database without further need to utilize the database definition, the extended field definition, the logical database view or any combination thereof. A utility program performing the above computer implemented steps is hereinafter referred to in this specification as an "integrated hierarchical schema constructor".

In another embodiment of the present invention, the above-described integrated hierarchical schema constructor may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for writing application code for accessing a hierarchical database on a computer system is also disclosed. An integrated hierarchical schema constructor is invoked to automatically generate a hierarchical database schema report wherein the hierarchical database schema report comprises information from at least one database definition, at least one logical database view, at least one extended field definition and at least one control statement. The hierarchical database schema report is utilized to write the application code without further utilizing the database definition, without further utilizing the extended field definition and without further utilizing the logical database view, whereby the application code may be used to access the hierarchical database.

In this way, the arcane, time-consuming and error prone process of reading legacy data structures formatted for machine consumption can be eliminated dulling the process of building application program code for accessing hierarchical databases. Utilizing, a single invocation of an integrated hierarchical schema constructor, a hierarchical database schema report may be generated to present an organized and comprehensive report for enhancing the efficiency of application program development where hierarchical database access is required.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 4 shows an exemplary database definition for the hierarchical database;

FIG. 5 shows an exemplary logical database view of the hierarchical database;

FIG. 6 shows exemplary control statement syntax;

FIG. 7 shows additional exemplary control statement syntax;

FIG. 15 shows an exemplary hierarchical database schema report;

DETAILED DESCRIPTION

The present invention overcomes the problems associated with the prior art by teaching a system, computer program product, and method for) the automatic generation of a hierarchical database schema report to facilitate hierarchical database application program development. In the following detailed description, numerous specific details are set forth in order to provide a thorough understanding of the present invention. Those skilled in the art will recognize, however, that the teaching contained herein may be applied to other embodiments and that the present invention may be practiced apart from these specific details. Accordingly, the present invention should not be limited to the embodiments shown but is to be accorded the widest scope consistent with the principles and features described and claimed herein. The following description is presented to enable one of ordinary skill in the art to make and use the present invention and is provided in the context of a patent application and its requirements.

Figure 1:
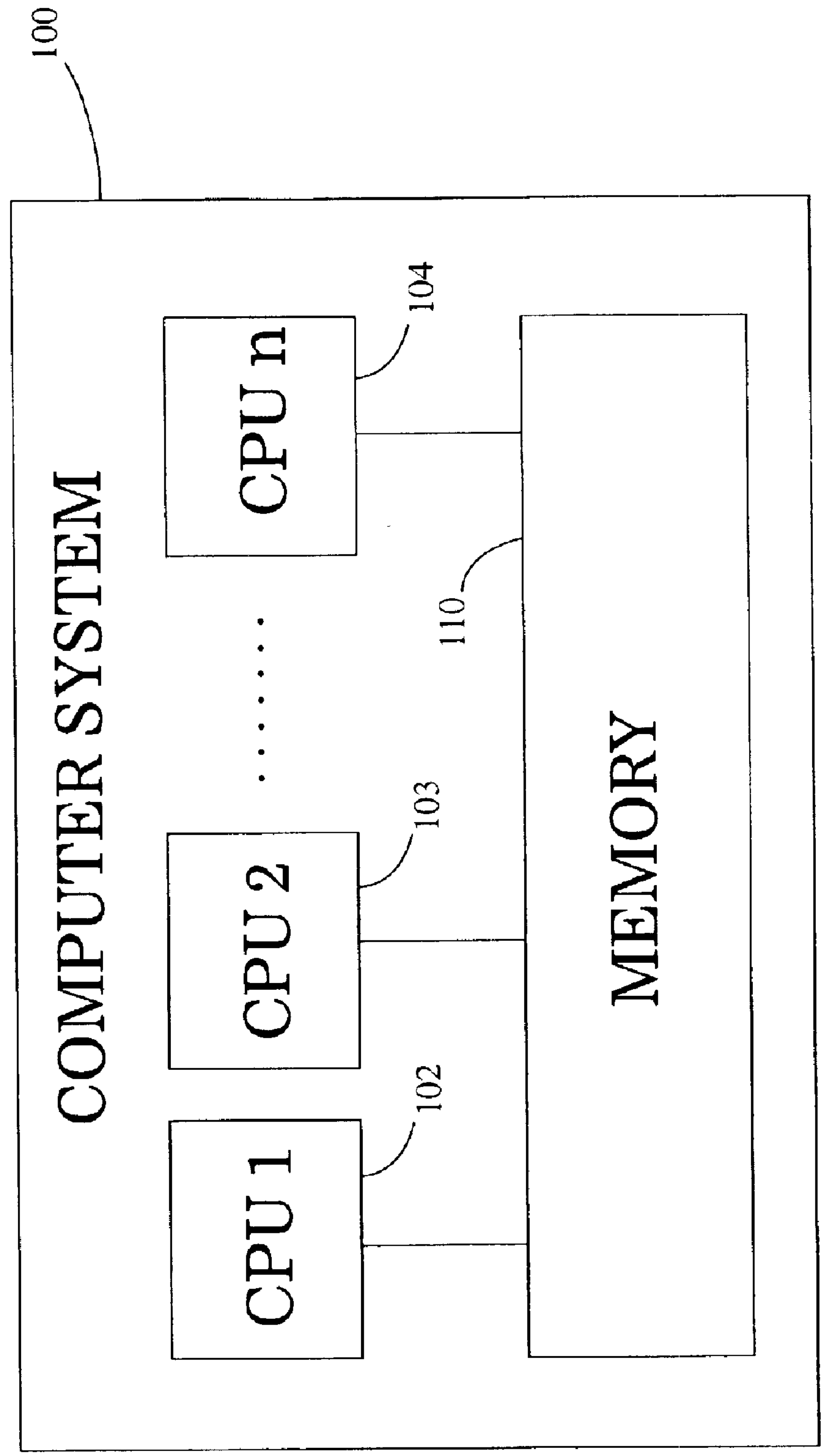
FIG. 1 is a block diagram of a typical computer system wherein the present invention may be practiced.

FIG. 1 is a block diagram of a computer system 100, such as the S/390 mainframe computer system, in which teachings of the present invention may be embodied. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, numerous other components may be utilized with computer system 100, such as input/output devices comprising keyboards, displays, direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

Figure 2:
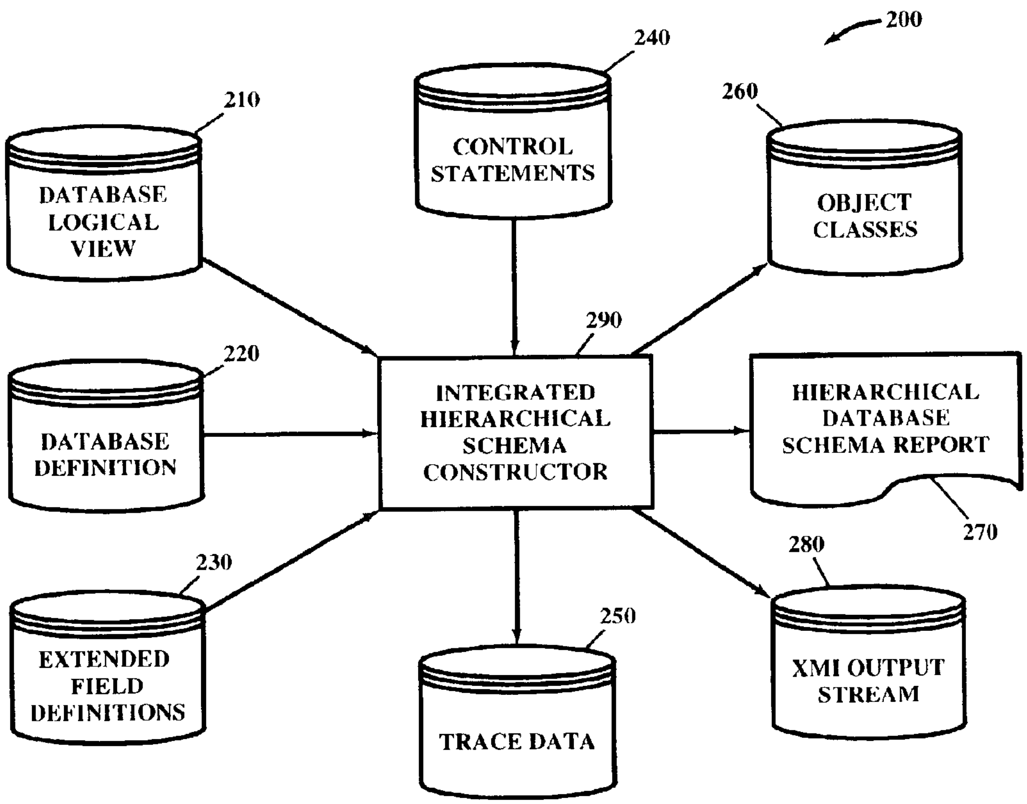
FIG. 2 shows a block diagram summarizing the inputs and outputs of an integrated hierarchical schema constructor in accordance with the present invention.

Referring now to FIG. 2, block diagram 200 illustrates the inputs and outputs of a utility program in accordance with the present invention. A utility program designed to generate hierarchical database schema report 270, with comprehensive and user friendly structured information, is referred to herein as an "integrated hierarchical schema constructor" 290. Integrated hierarchical schema constructor 290 may be optionally combined, as those of ordinarily skill in the art will appreciate, with other functions such as an automatic class generation facility as more fully described in the related Automatic Class Generation application identified supra.

Database definition 220 represents a physical description of a hierarchical database, such as a DBD (Database Description) in the case of an IMS database. This information typically comprises descriptions of the hierarchical segments, their hierarchical relationships, and searchable fields within the segments.

Database logical view 210 represents a logical view of one or more hierarchical databases, as required for a particular application using the database. This information typically comprises segments within the physical database that the application is authorized to process and the hierarchical relationship of those segments. In the case of IMS, this logical view of information is contained within a PSB, which is in turn comprised of one or more PCBs, each of which encompasses one or more logical views applied to single or multiple IMS databases.

Since the database definition typically contains field information for just the searchable fields, extended field definitions 230 are also input to integrated hierarchical schema constructor 290. These extended field definitions provide additional segment mapping detail and are typically contained with high-level language constructs, such as COBOL copybooks.

Optional control statements 240 may also input to integrated hierarchical schema constructor 290. These control statements direct the processing flow according to the desired features and functions to be performed. Optionally, these control statements may also be used, in conjunction with generating object classes 260, to customize an object class to take advantage of features within Java, or other object oriented programming environment, that are not available within the legacy environment. For example, Java alias names may be established for any segment or field; and the name can be any length, as required, to enable the name to convey information about the named entity. Reasonable naming conventions improve programmer efficiency and reduce programmer errors. Additionally, a generated report and object class can be customized with new field names to accommodate new features or application extensions.

Integrated hierarchical schema constructor 290, utilizing selected information from inputs 210, 220, 230 and 240 outputs an hierarchical database schema report 270 in a structured and user friendly format to be utilized by an application programmer to efficiently and easily access the information required to write code that accesses hierarchical data. Furthermore, this information is comprehensive in that it obviates the need to consult other database source materials in collecting the information required to write code that accesses hierarchical data In conjunction with the generation of hierarchical database schema report 270, integrated hierarchical schema constructor 290 may optionally generate object classes, 260, as more fully disclosed in the related "automatic class generation" application identified supra.

Additionally, integrated hierarchical schema constructor 290 may optionally generate an XMI output stream 280, representative of all metadata encapsulated within object classes 260, as more fully disclosed in the related "automatic class generation" application identified supra. The XMI output stream 280 may be utilized by other applications and tools to regenerate object classes 260 into an alternative form appropriate for a particular application's usage. Furthermore, integrated hierarchical schema constructor 290 optionally outputs trace data 250. This information may be utilized for status and debugging purposes, as well as for facilitating additional application development.

Generally, the novel methods disclosed herein may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
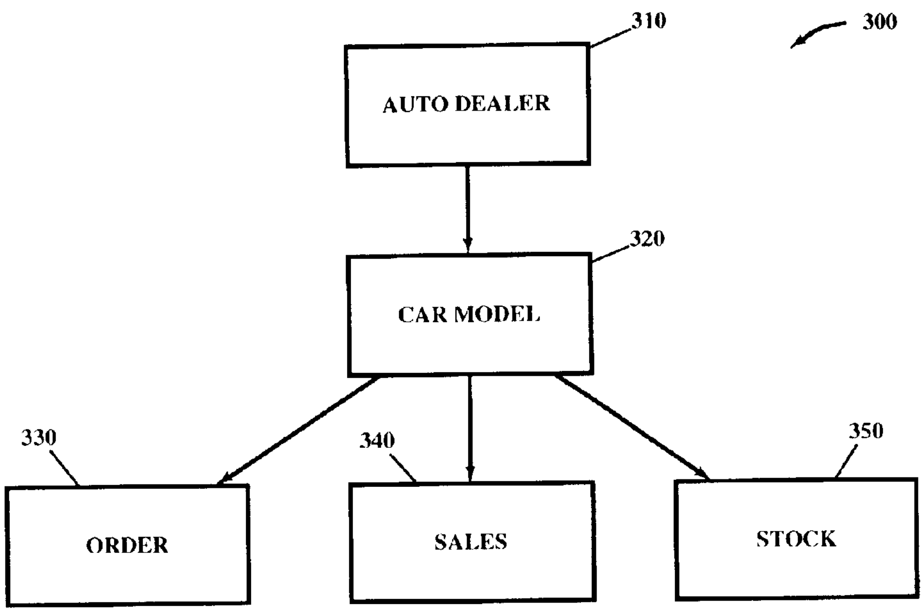
FIG. 3 shows a high level model of an exemplary hierarchical database.

Referring now to FIG. 3, a model 300 of an exemplary hierarchical database is shown. This exemplary hierarchical database will serve as the basis for various examples provided as an aid to understanding the concepts taught herein. Auto Dealer segment 310 identifies an automobile dealership selling cars. This segment may contain fields, such as the name of the dealership, and the dealership address.

Dealers carry car types, each of which has a corresponding Car Model segment 320. A Car Model segment may contain fields such as the car model (e.g. Nissan Maxima), and a model description. Other segments include Order 330, Sales 340 and Stock 350 representing information pertaining to orders, sales and inventory, respectively, for each car model, with additional fields defined appropriate to their usage within an application.

Referring now to FIG. 4 an exemplary hierarchical database definition 400 is shown, in accordance with model 300 discussed supra. In FIG. 5 an exemplary database logical view 500 is shown representing the logical view of all exemplary application requiring access to the hierarchical database defined by database definition 400. FIG. 6 shows a set of control statements specifying processing options and identifying a logical database view. In addition, an "Include" control statement identifies a second file of additional control statements shown in FIG. 7. The control statements 700 of FIG. 7 further customize database logical view 500 with additional segment and field information. Taken together, FIGS. 4–7, along with any extended field definitions (not shown), represent the Source data from which integrated hierarchical schema constructor 290 acquires needed information to generate hierarchical database schema report 1500, shown in FIG. 15, to facilitate hierarchical database application program development by an application programmer.

An automatically generated Java Class corresponding to the data depicted in FIGS. 4 through 7 is shown in Appendix A. A developer of an IMS Java application could, in theory, use this metadata class (or its java source file) as a comprehensive reference source for understanding the data view of the application and gleaning sufficient information to write code that accesses hierarchical data. However, this metadata class is optimized in its organization for consumption by the IMS Java system code and, accordingly, is greatly lacking in its suitability for use by a human developer.

This stands in stark contrast to hierarchical database schema report 1500, FIG. 15, where the structure of the IMS database is summarized in a way that allows the developer to create an IMS application and to code JDBC or IMS calls against the databases, without needing to interpret the syntax of the IMS Java metadata class (Appendix A) and without needing to refer to and interpret the syntax of IMS Source data, such as the DBD or PSB. The hierarchical database schema report presents the application developer with the following essential information, in one place, repeated for each hierarchy (i.e. multiple PCBs for an IMS database):

Names of the database segments in the hierarchy
Hierarchic relationship of the segments to each other
Fields in each segment, their positions and lengths
Identification of search and indexed fields
Data types of the fields Although the hierarchical database schema report was introduced to assist the writing of IMS Java applications, those of ordinary skill in the art will appreciate that it may also be used by developers for writing applications for other hierarchical databases and in other programming languages.

Figure 8:
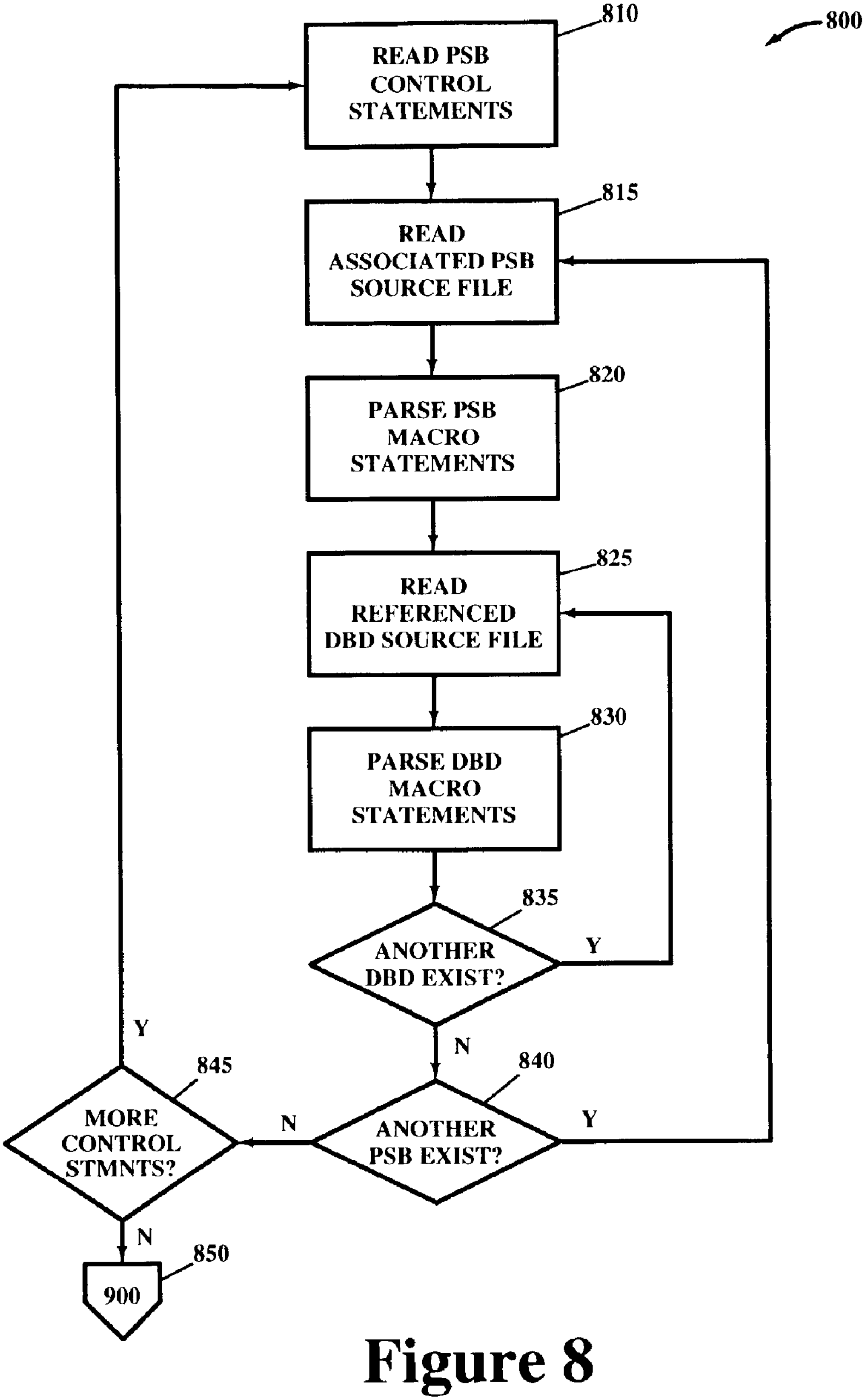
FIG. 8 is a flow diagram summarizing phase 1 processing of the integrated hierarchical schema constructor in accordance with one embodiment of the present invention.

Continuing with FIGS. 8–14, a preferred embodiment is described within the context of an IMS hierarchical database and Java programming language. Referring now to FIG. 8, flow diagram 800 illustrates the high level flow of the first phase of processing performed by integrated hierarchical schema constructor 290 which builds an in-memory model of the hierarchical database legacy data structures. In step 810, integrated hierarchical schema constructor 290 reads PSB control statements from an MVS dataset, or from an HFS (Hierarchical File System) file. In one preferred embodiment, the first control statement is an option statement which specifies execution and input/output options (as shown in FIG. 6).

Next, in step 815, a PSB source file is read. The PSB is the IMS data structure that represents the logical view of the hierarchical database The control statement specifies the name of the PSB to be read and processed, and may also optionally specify a Java name to be associated with this PSB. Continuing with step 820, the PSB source macro statements are parsed and selected information accumulated into the in-memory model representing the hierarchical database metadata.

In step 825, the source file of a referenced DBD is read and in step 830 the DBD source macro statements are parsed and selected information accumulated into the in-memory model representing the hierarchical database metadata. The in-memory model captures all information related to segments and fields and their hierarchical relationships. In step 835, a test is made to determine if additional DBDs are referenced by the PSB. If so, control passes back to step 825 where processing continues as discussed supra. Otherwise, in step 840, a test is made to determine if additional PSBs are associated with the PSB control statement currently being processed. This may occur where the PSB control statement incorporates a generic name, such as a "wild card" naming convention, wherein all PSBs matching the name form are to be processed. If one or more PSBs remain to be processed, control passes back to step 815 where processing continues as discussed supra.

Returning now to step 840, if there are no more PSBs to process for this PSB control statement, then processing continues with step 845, where a test is made to determine if additional PSB control statements exist. If so, control returns to step 810 and processing continues as discussed supra. Otherwise, in step 850 control passes to the beginning of flow diagram 900 of FIG. 9. Each PSB is reflected individually in the model, with its segments and fields; but if the PSBs share logical or physical databases, only a single instance of each database is added to the in-memory model and shared by the referencing PSBs.

Figure 9:
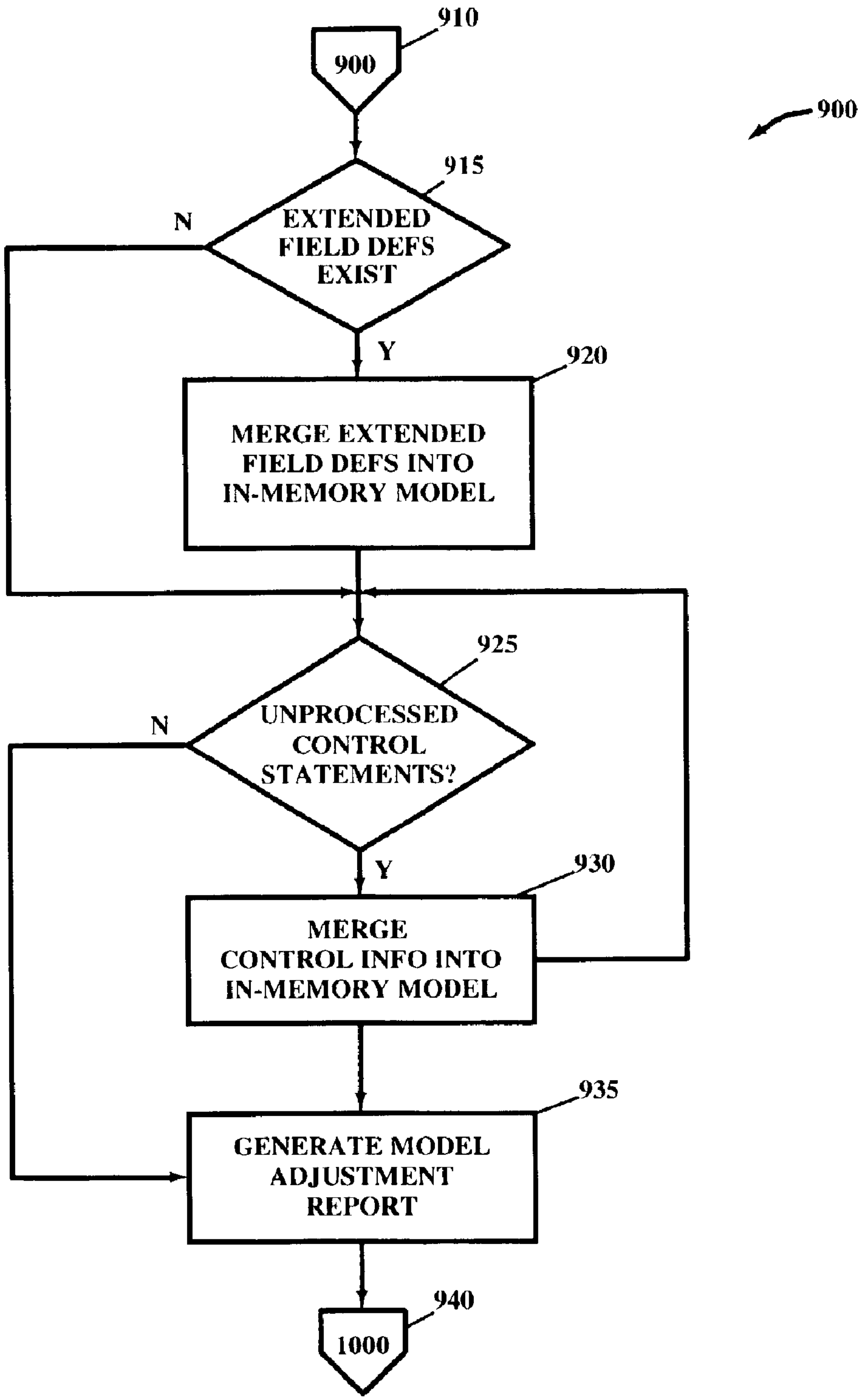
FIG. 9 is a flow diagram summarizing phase 2 processing of the integrated hierarchical schema constructor in accordance with one embodiment of the present invention.

Referring now to FIG. 9, flow diagram 900 illustrates phase 2 processing of integrated hierarchical schema constructor 290, where phase 2 operations carry out adjustments to the in-memory model that was built from phase I processing, described in flow diagram 800. Adjustments may be made in several areas, including adding additional fields, creating Java-style aliases and establishing formatting information, such as Java data types.

First, step 910 receives control from step 850 of flow diagram 800, FIG. 8. Processing continues with step 915, where a test is made to determine if extended field definitions are present, such as COBOL copybooks. Those of ordinary skill in the art will recognize that this information may be provided in a transformed form produced by an importer, such as an XMI data stream conforming to the HLL language metamodel, or any other intermediary data form. If extended field definitions are present then, in step 920, this additional field information is merged into the in-memory model before proceeding to the test at step 925. An extended field definition is related to a particular DBD and physical segment through a segment control statement. Fields found in the extended field definition that are not yet in the model are added to the segment with their field name, offset, length and dart type. It, however, a field in the extended field definition coincides (same starting offset and length) with an existing field in the model, then a new field is not added to the model. Instead, the Java name and the data type in the existing model field are set to the name and data type of the field in the extended field definition. Those of ordinary skill in the art will recognize that many detailed design decisions are possible within the framework of the teachings contained herein. For example, in another embodiment, an error could be generated when extended field definitions coincide with existing fields within the in-memory model.

Returning now to step 915, if extended field definitions are not present, processing continues with step 925 where a test is made to determine the presence of additional control statements. If additional unprocessed control statements exist, the processing continues with step 930, otherwise control passes to step 935. Step 930 merges additional control statement information into the in-memory model.

A 'PSB' control statement type allows the user to specify an alias name for a PSB, which determines the name of the generated IMS Java class. A 'PCB' control statement type allows the user to specify an alias name for an existing PCB within a PSB. A 'SEGM' control statement type allows the user to specify an alias Java name for an existing logical or physical segment. A 'field' control statement type allows the user to specify a field in a specified DBD and/or a physical segment, either by its starting offset and length, or by its 8-character IMS name. A new field object is created in the model if not already present. If the field is coincident with an existing field (same 8-character name, or same starting offset and length) then the information in the existing field is overridden by the control statement information. An 'XDFLD' statement allows an alias to be provided for an IMS secondary index field already specified within the DBD. A 'field' type control statement takes precedence over extended field definitions where conflicts occur.

Processing continues from step 930 to step 935, where a Model Adjustment Report is generated summarizing status information accumulated during the building of the in-memory model (the Model Adjustment Report is not shown). In step 940, control passes to the beginning of flow diagram 1000, FIG. 10.

Figure 10:
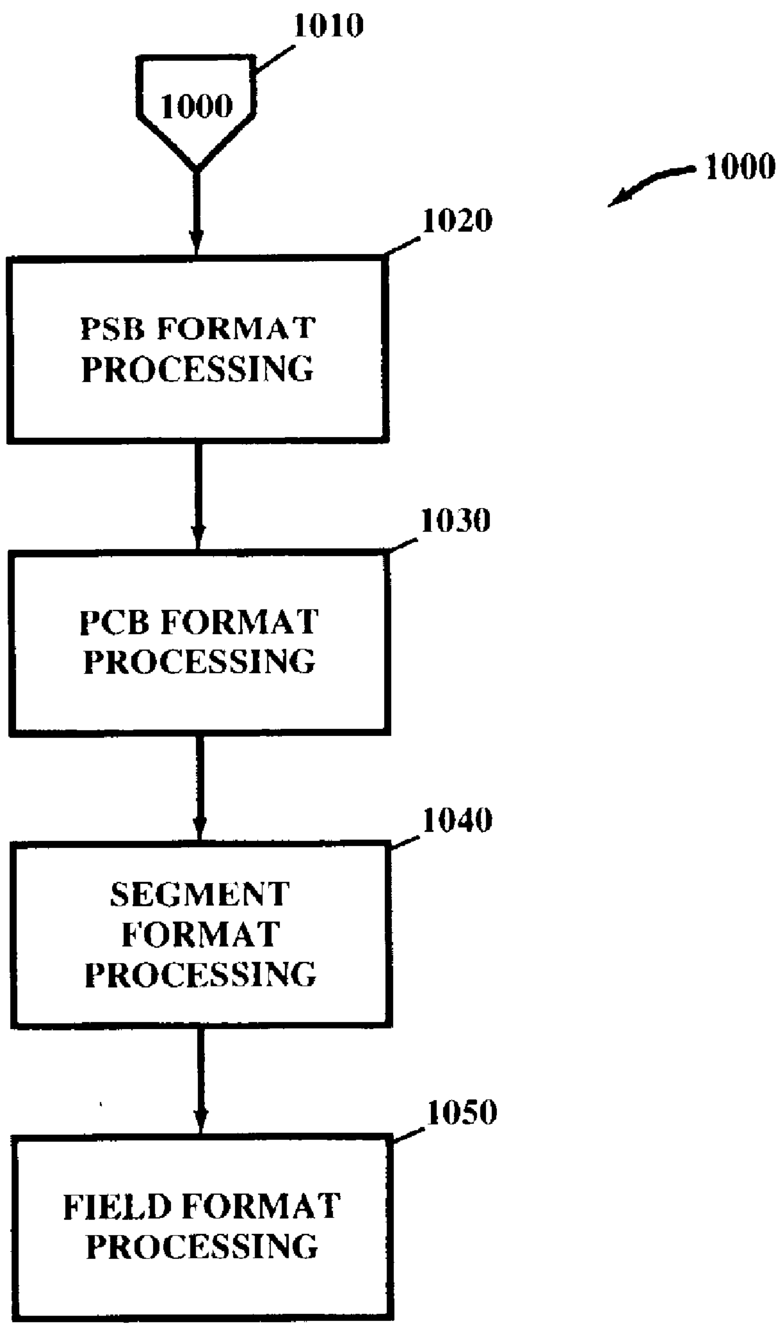
FIG. 10 is a flow diagram summarizing phase 3 processing of the integrated hierarchical schema constructor in accordance with one embodiment of the present invention.

Referring now to FIG. 10, flow diagram 1000 summarizes the high level logic flow of the third phase of processing for integrated hierarchical schema constructor 290, where the contents of the in-memory model are formatted into a hierarchical database schema report for use by application programmers in writing code to access hierarchical data. First, step 1010 receives control from step 940 of flow diagram 900, FIG. 9. Processing continues with step 1020, where PSB format processing occurs. Next, in step 1030, PCB format processing occurs. Then, in step 1040, segment format processing Occurs followed by field format processing in step 1050.

Figure 11:
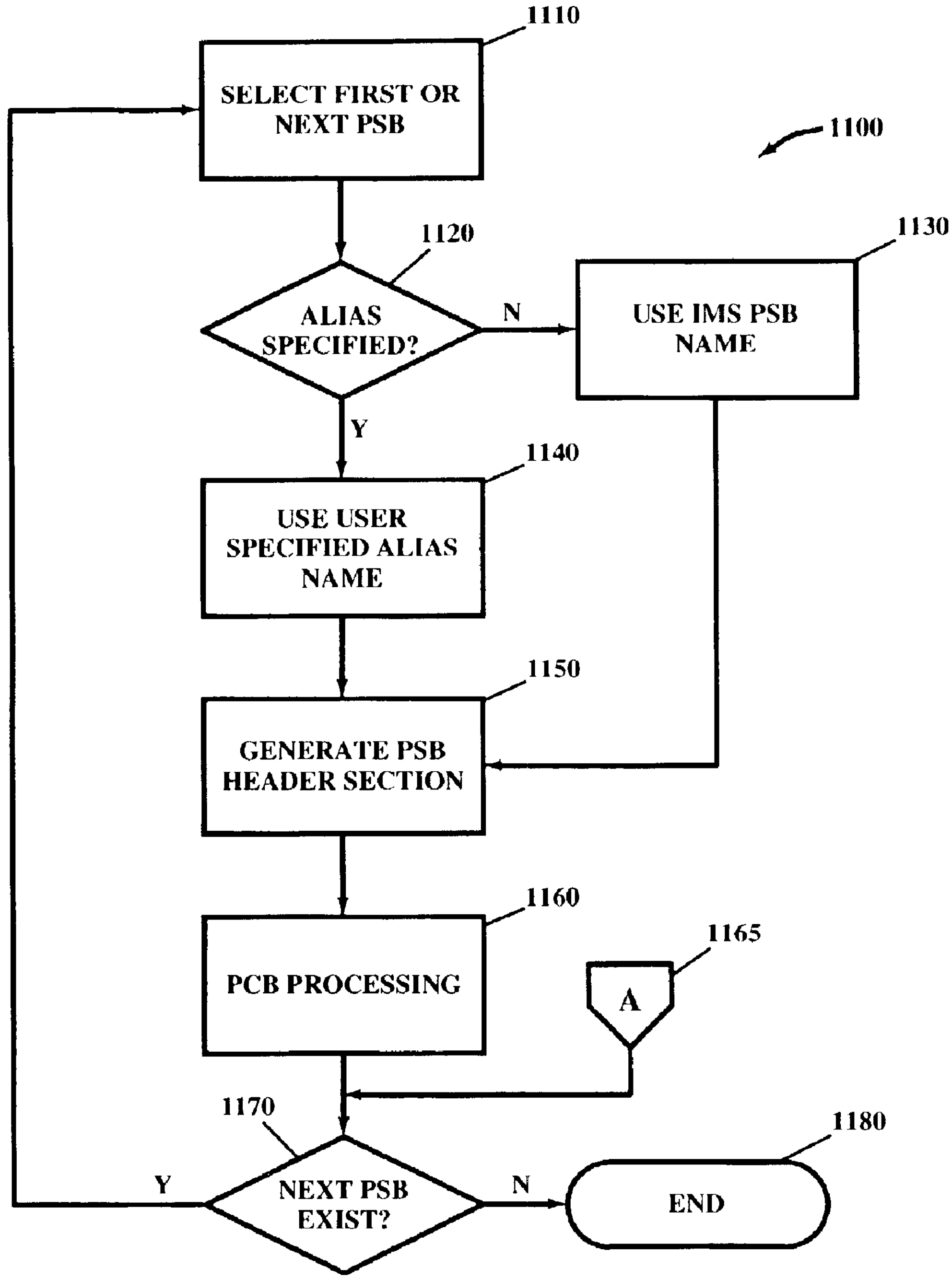
FIG. 11 is a flow diagram summarizing additional detail for PSB processing in accordance with one embodiment of the present invention.

Referring now to FIGS. 11, 12, 13 and 14, flow diagrams 1100, 1200, 1300 and 1400, respectively, illustrate a more detailed logic flow corresponding to high level flow diagram 1000 of FIG. 10. Referring specifically now to FIG. 11 in conjunction with FIG. 15, in step 1110, the first or next PSB is selected from those PSBs identified in control statements 240. In step 1120, a test is made to determine if an alias name has been specified for this PSB and, if so, in step 1140 the user specified alias name is used to identify the PSB section of hierarchical database schema report; otherwise, in step 1130, the IMS PSB name is used. Continuing with step 1150, the PSB header section 1505 of the hierarchical database schema report is generated.

Those of ordinary skill in the art will recognize that the generation of a report may be accomplished in a variety of ways, including building a report in memory and writing it out upon completion, or writing the report as pieces are completed. Furthermore, it is also recognized by those of ordinary skill in the art that the writing of a report may be accomplished by displaying the report on a screen, writing the report to a file, or printing a hardcopy report. These and other known methods of generating reports are anticipated by the present disclosure.

Figure 12:
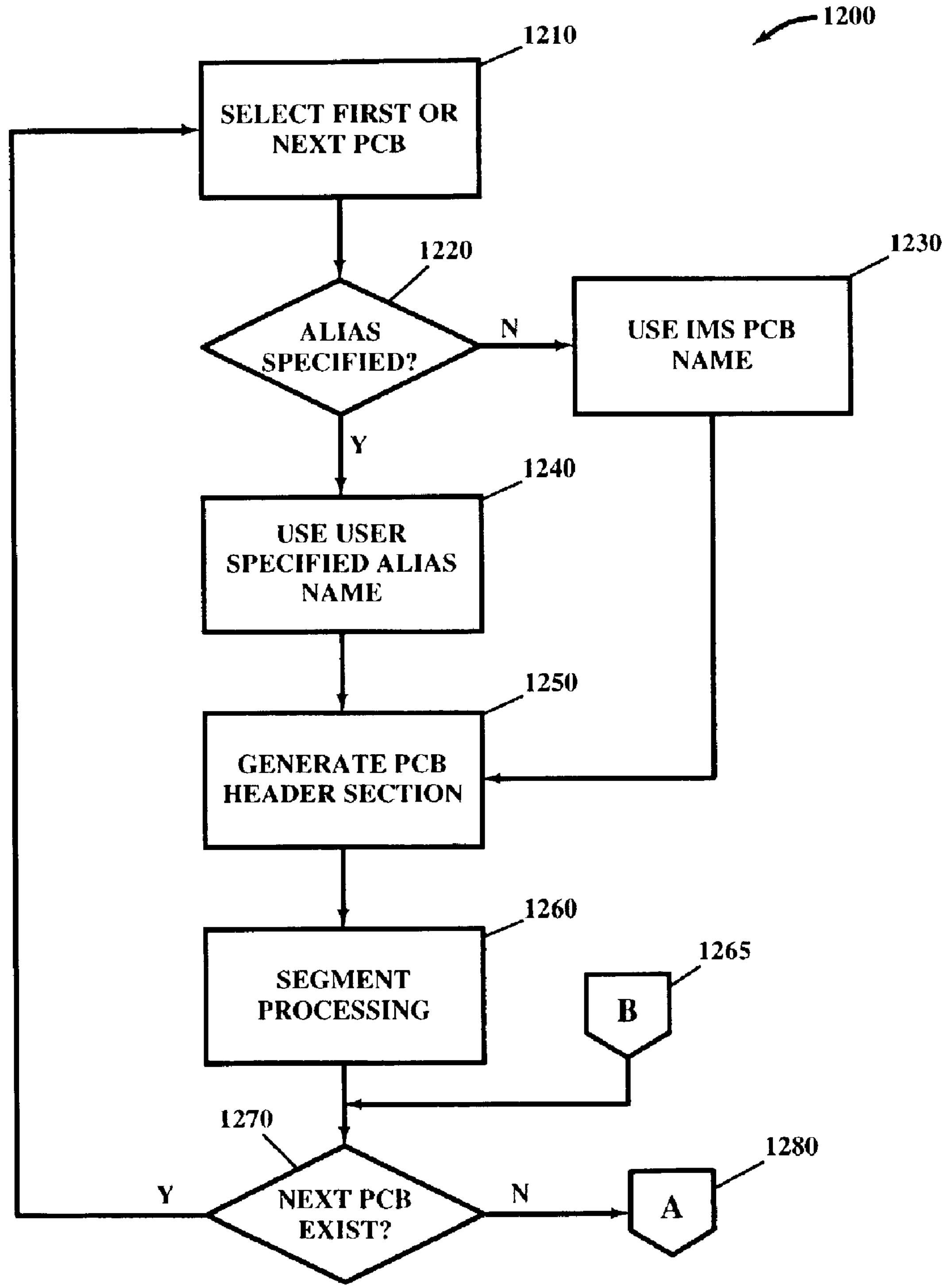
FIG. 12 is a flow diagram summarizing additional detail for PCB processing in accordance with one embodiment of the present invention.

In step 1160, PCB processing occurs for those PCBs associated with the current PSB, as shown in more detail in flow diagram 1200, FIG. 12, discussed infra. Then, upon return from flow diagram 1200 at return point 1165, processing next continues with step 1170 where a test is made to determine if additional PSBs are to be included in this hierarchical database schema report. If so, processing returns to step 1110, discussed supra; otherwise the processing to generate the hierarchical database schema report is complete and processing terminates at step 1180, whereby control returns to system 100.

Referring now to FIG. 12, in conjunction with FIG. 15, flow diagram 1200 illustrates the logic flow pertaining to PCB processing. In step 1210, the first or next PCB associated with the current PSB is selected for processing. In step 1220, a test is made to determine if an alias name was specified for this PCB and, if so in step 1240 the alias name is selected for use; otherwise, in step 1230, the IMS PCB name is selected for use. Continuing with step 1250, the PCB header section 1510 for this PCB is generated. In step 1260, segments associated with the current PCB are processed, as shown in more detail in flow diagram 1300, FIG. 13, discussed infra. Then, upon return from flow diagram 1300 at return point 1265, processing next continues with step 1270 where a test is made to determine if additional PCBs are associated with the current PSB. If so, processing returns to step 1210, discussed supra; otherwise the processing to generate all PCBs for the current PSB is complete whereby control returns, at step 1280, to step 1165 of flow diagram 1100, FIG. 11, to complete PSB processing.

Figure 13:
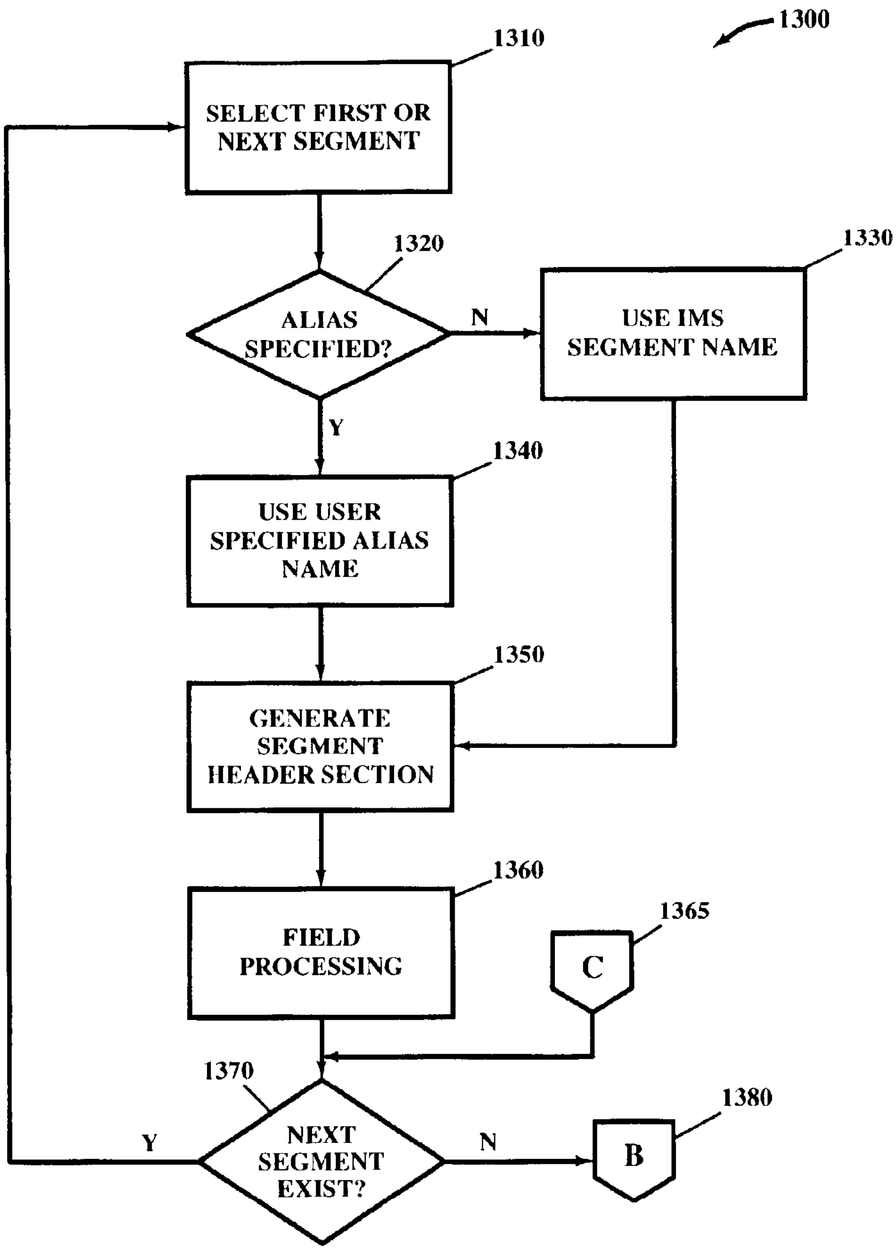
FIG. 13 is a flow diagram summarizing additional detail for segment processing in accordance with one embodiment of the present invention.

Referring now to FIG. 13, in conjunction with FIG. 15, flow diagram 1300 illustrates the logic flow pertaining to segment processing. In step 1310, the first or next segment associated with the current PCB is selected for processing. In step 1320, a test is made to determine if an alias name was specified for this segment and, if so in step 1340 the alias name is selected for use; otherwise, in step 1330, the IMS segment name is selected for use. Continuing with step 1350, the segment header section for this segment is generated. In the first instance, segment header 1520 is generated and in turn, with each segment iteration, segment headers 1530, 1540, 1550 and 1560 are likewise generated. In step 1360, the fields associated with the current segment are processed, as shown in more detail in flow diagram 1400, FIG. 14, discussed infra. Then, upon return from flow diagram 1400 at return point 1365, processing next continues with step 1370 where a test is made to determine if additional segments are associated with the current PCB. If so, processing returns to step 1310, discussed supra; otherwise the processing to generate all segments for the current PCB is complete, whereby control returns, at step 1380, to step 1265 of flow diagram 1200, FIG. 12, to complete PCB processing.

Figure 14:
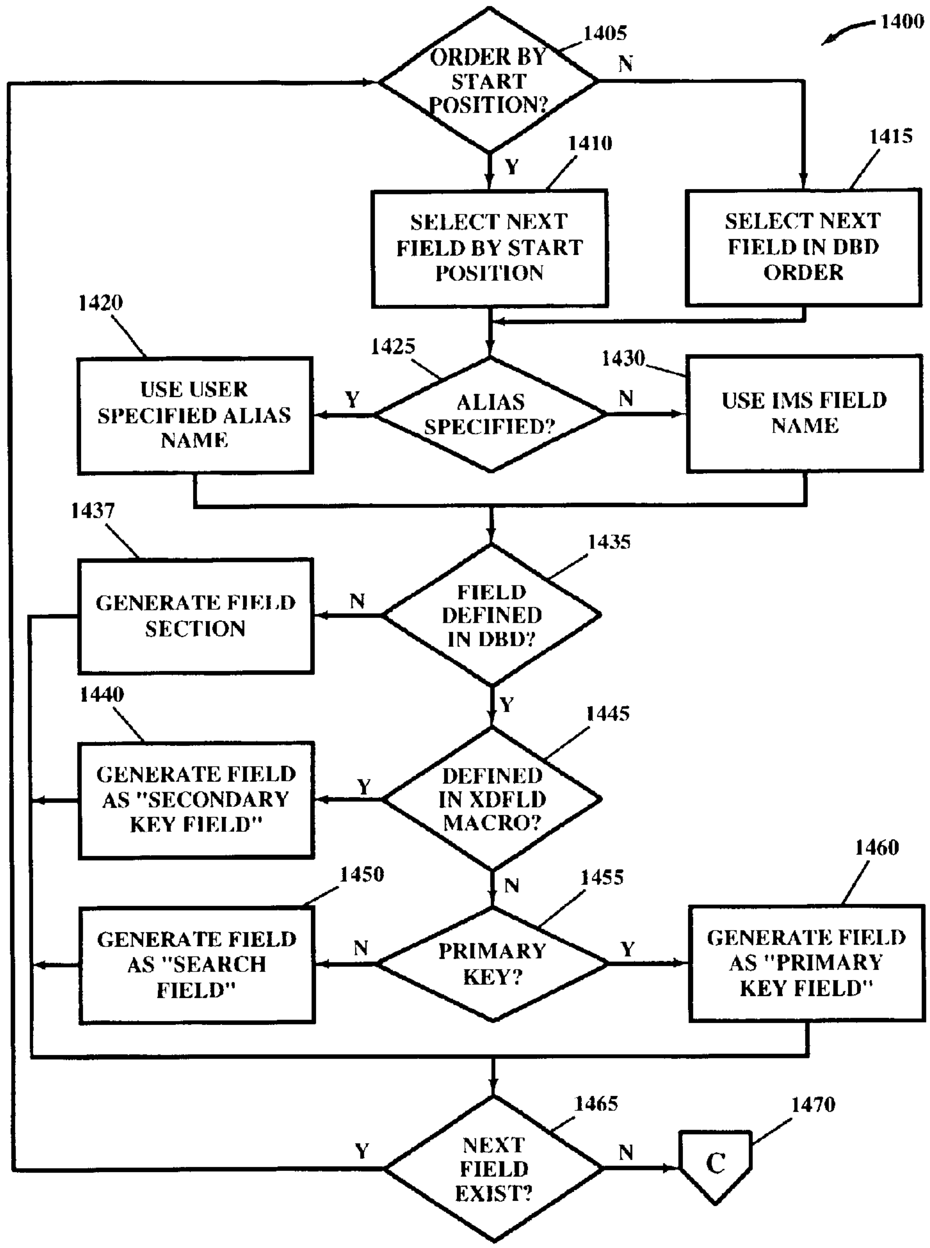
FIG. 14 is a flow diagram summarizing additional detail for field processing in accordance with one embodiment of the present invention.

Referring now to FIG. 14, in conjunction with FIG. 15, flow diagram 1400 illustrates the logic flow pertaining to field processing. In step 1405, a test is made to determine how fields are to be ordered. If they are to be ordered by start position, then, in step 1410, the first or next field in start order sequence is selected for processing; otherwise, in step 1415, the first or next field in accordance with the DBD specification is selected.

Integrated hierarchical schema constructor 290 automatically determines field layouts for segments in logical hierarchies that may be "concatenated segments" (i.e., segments containing the data from two or more underlying physical segments in physical hierarchies). It also allows for hierarchy inversion resulting from the use of secondary indexes. In fact the report reflects all options available to Database Administrators when defining IMS databases, including the following situations (among others):

1) Concatenated segments, involving real or virtual logical children

2) Noncontiguous key fields in virtual logical children

3) Segments with secondary indexing field descriptions (i.e., XDFLD macros)

4) System related fields (e.g., /SX and /CK fields)

5) PSBs specifying secondary processing sequence

6) Secondary indices processed as stand-alone databases

7) PSBs specifying field-level sensitivity

Continuing with step 1425, a test is made to determine if an alias was specified for the current field. If so, in step 1420, the alias name is selected to represent the current field; otherwise, in step 1430, the IMS field name is used.

Continuing with step 1435, a test is made to determine if the current field is defined within the DBD. If the current field is not defined in the DBD, then this field is generated in step 1437 without any annotations reflecting, special field use (e.g. as a primary key, secondary key or search field) and processing continues with step 1465. Otherwise, the current field is defined in a DBD and, accordingly, processing continues with step 1445 where a test is made to determine if the current field is defined in an XDFLD macro. If so, in step 1440, the current field is generated with an annotation designating the field as a "secondary key field" and processing continues with step 1465. Otherwise, at step 1455 a test is made to determine if the current field is a primary key. If so, in step 1460 the current field is generated with an annotation designating the field as a "primary key field"; otherwise, in step 1450, the current field is generated with an annotation designating the field as a "search field".

Continuing with step 1465, a test is made to determine if there is another field to process for this segment. If so, control returns to step 1405, discussed supra. Otherwise, all fields for the current segment have been processed and control returns, at step 1470, to step 1365 of flow diagram 1300, FIG. 13.

In the first instance, field 1521 is generated and in turn, with each field iteration, fields 1522 and 1523 are likewise generated. On subsequent calls to the field processing routine, the fields for segments 1530 through 1560 are likewise generated.

Taken in combination flow diagram 800, 900, 1000, 1100, 1200, 1300 and 1400 in conjunction with supporting diagrams and detailed descriptions provide for enhanced programmer productivity and improved code quality by automatically generating a hierarchical database schema report. This report may be used by application programmers in place of complex IMS source macros and object classes with arcane syntax to obtain essential information required to write code that accesses hierarchical data. Although flow diagrams 800 through 1400 use IMS and Java as exemplary platforms, those of ordinary skill in the art will appreciate that the teachings contained herein apply to any hierarchical database and any programming language environment. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modifications and adaptations to the embodiment(s) shown may occur to one of ordinary skill in the art without departing from the scope of the present invention as set forth in the following claims. Thus, the scope of this invention is to be construed according to the appended claims and not limited by the specific details disclosed in the exemplary embodiments.

Express Label #: EU314602794US

Appendix A: Generated Java Class

```
package com.ibm.ims.tooling;

import com.ibm.ims.db.*;
import com.ibm.ims.base.*;

public class DealerDatabaseView extends DLIDatabaseView {

// This class dscribes the data view of PSB: DLR_PSB
// PSB DLR_PSB has database PCBs with 8-char PCBNAME or label:
//     DLR_PCB1

// The following DLITypeInfo[] array describes Segment: DEALER in PCB: DLR_PCB1
    static DLITypeInfo[] DLR_PCB1DEALERArray= {
        new DLITypeInfo("DealerNumber", DLITypeInfo.CHAR, 1, 4, "DLRNO"),
        new DLITypeInfo("DLRNAME", DLITypeInfo.CHAR, 5, 30, "DLRNAME"),
        new DLITypeInfo("DealerName",DLITypeInfo.CHAR,5, 30),
        new DLITypeInfo("YTDSales","S9(18)", DLITypeInfo.PACKEDDECIMAL,85, 10)
        };
    static DLISegment DLR_PCB1DEALERSegment= new DLISegment
        ("DealerSeg","DEALER",DLR_PCB1DEALERArray,94);

// The following DLITypeInfo[] array describes Segment: MODEL in PCB: DLR_PCB1
    static DLITypeInfo[] DLR_PCB1MODELArray= {
        new DLITypeInfo("ModelTypeCode", DLITypeInfo.CHAR, 1, 2, "MODTYPE"),
        new DLITypeInfo("CarMake", DLITypeInfo.CHAR, 3, 10, "MAKE"),
        new DLITypeInfo("EPAHighwayMilage",DLITypeInfo.CHAR,36, 4),
        new DLITypeInfo("Horsepower",DLITypeInfo.CHAR,40, 4)
        };
    static DLISegment DLR_PCB1MODELSegment= new DLISegment
        ("ModelSeg","MODEL",DLR_PCB1MODELArray,43);

// The following DLITypeInfo[] array describes Segment: ORDER in PCB: DLR_PCB1
    static DLITypeInfo[] DLR_PCB1ORDERArray= {
        new DLITypeInfo("OrderNumber", DLITypeInfo.CHAR, 1, 6, "ORDNBR"),
        new DLITypeInfo("PurchaserLastName", DLITypeInfo.CHAR, 50, 25, "LASTNME"),
        new DLITypeInfo("Price","99999", DLITypeInfo.ZONEDDECIMAL,37, 5),
        new DLITypeInfo("OrderDate",DLITypeInfo.CHAR,42, 8),
        new DLITypeInfo("DeliverDate",DLITypeInfo.CHAR,120, 8)
        };
```

Express Label #: EU314602794US

Appendix A - continued

```
   static DLISegment DLR_PCB1ORDERSegment= new DLISegment
      ("OrderSeg","ORDER",DLR_PCB1ORDERArray,127);

// The following DLITypeInfo[] array describes Segment: SALES in PCB: DLR_PCB1
   static DLITypeInfo[] DLR_PCB1SALESArray= {
      new DLITypeInfo("DateSold", DLITypeInfo.CHAR, 1, 8, "SALDATE"),
      new DLITypeInfo("PurchaserLastName", DLITypeInfo.CHAR, 9, 25, "LASTNME"),
      new DLITypeInfo("PurchasetFirstName", DLITypeInfo.CHAR, 34, 25, "FIRSTNME"),
      new DLITypeInfo("SoldBy",DLITypeInfo.CHAR,84, 10)
      };
   static DLISegment DLR_PCB1SALESSegment= new DLISegment
      ("SalesSeg","SALES",DLR_PCB1SALESArray,113);

// The following DLITypeInfo[] array describes Segment: STOCK in PCB: DLR_PCB1
   static DLITypeInfo[] DLR_PCB1STOCKArray= {
      new DLITypeInfo("StockVINumber", DLITypeInfo.CHAR, 1, 20, "STKVIN"),
      new DLITypeInfo("Price","99999", DLITypeInfo.ZONEDDECIMAL,47, 5, "PRICE")
   };
   static DLISegment DLR_PCB1STOCKSegment= new DLISegment
      ("StockSeg","STOCK",DLR_PCB1STOCKArray,62);

// An array of DLISegmentInfo objects follows to describe the view for PCB: DLR_PCB1
static DLISegmentInfo[] DLR_PCB1array = {
      new DLISegmentInfo(DLR_PCB1DEALERSegment,DLIDatabaseView.ROOT),
      new DLISegmentInfo(DLR_PCB1MODELSegment,0),
      new DLISegmentInfo(DLR_PCB1ORDERSegment,1),
      new DLISegmentInfo(DLR_PCB1SALESSegment,1),
      new DLISegmentInfo(DLR_PCB1STOCKSegment,1)
      };


//Constructor
public DealerDatabaseView() {
   super("DLR_PSB", "DealershipDB", "DLR_PCB1", DLR_PCB1array);
   } // end DealerDatabaseView constructor

} // end DealerDatabaseView class definition
```

What is claimed:

1. A computer implemented method for automatically generating a hierarchical database schema report to facilitate writing application code for accessing a hierarchical database comprising the steps of:

(a) accessing a database definition;

(h) accessing a logical database view;

(c) accessing an extended field definition;

(d) accessing control statement information;

(e) building an in-memory representation of selective information obtained from steps (a) through (d) to automatically generate and customize a class for use by an object oriented programming language to access said hierarchical database; and (f) automatically generating said hierarchical database schema report utilizing said in-memory representation wherein said hierarchical database schema report may be utilized to write said application code to access said hierarchical database without further need to use said database definition, said extended held definition, said logical database view or any combination thereof wherein said hierarchical database schema report comprises at least one concatenated segment from a logical hierarchy wherein said concatenated segment comprises data from two or more underlying physical segments.

2. The method of claim 1 wherein said object oriented programming language is Java.

3. The method of claim 1 further comprising using said in-memory representation to generate an XMI stream of metadata that defines said class wherein said XMI stream may be used to regenerate said class in a new form as required by an application program.

4. The method of claim 1 wherein said hierarchical database is an IMS database.

5. The method of claim 4 wherein said database definition is a DBD.

6. The method of claim 5 wherein said logical database view is a PSB.

7. The method of claim 1 wherein said database definition, said logical database view and said extended field definition comprise one or more database definitions, logical database views and extended field definitions, respectively.

8. The method of claim 1 wherein said extended field definition comprises a COBOL copybook.

9. The method of claim 8 wherein said COBOL copybook is in the form of an XMI metadata stream.

10. The method of claim 1 wherein said hierarchical database schema report identifies at least one field as a secondary key field.

11. The method of claim 1 wherein said hierarchical database schema report identifies at least one field as a search field.

12. The method of claim 11 wherein said hierarchical database schema report identifies at least one field as a primary key field.

13. A computer system for automatically generating a hierarchical database schema report to facilitate writing application code for accessing a hierarchical database, said computer system comprising:

(a) a computer;

(b) means for accessing a database definition;

(c) means for accessing a logical database view;

(d) means for accessing an extended field definition;

(e) means for accessing control statement information;

(f) means for building an in-memory representation of selective information utilizing (b) through (c) to automatically generate and customize a class for use by an object oriented programming language to access said hierarchical database; and (g) means for automatically generating said hierarchical database schema report utilizing said in-memory representation wherein said hierarchical database schema report may be utilized to write said application code to access said hierarchical database without further need to rite said database definition, said extended field definition, said logical database view or any combination thereof wherein said hierarchical database schema report comprises at least one concatenated segment from a logical hierarchy wherein said concatenated segment comprises data from two or more underlying physical segments.

14. The computer system of claim 13 wherein said object oriented programming language is Java.

15. The computer system of claim 13 further comprising using said in-memory representation to generate an XMI stream of metadata that defines said class wherein said XMI stream may be used to regenerate said class in a new form as required by an application program.

16. The computer system of claim 13 wherein said hierarchical database is an IMS database.

17. The computer system of claim 16 wherein said database definition is a DBD.

18. The computer system of claim 17 wherein said logical database view is a PSB.

19. The computer system claim 13 wherein said database definition, said logical database view and said extended field definition comprise one or more database definitions, logical database views and extended field definitions, respectively.

20. The computer system of claim 13 wherein said extended field definition comprises a COBOL copybook.

21. The computer system of claim 20 wherein said COBOL copybook is in the form of an XMI metadata stream.

22. The computer system of claim 13 wherein said hierarchical database schema report identifies at least one field as a secondary key field.

23. The computer system of claim 13 wherein said hierarchical database schema report identifies at least one field as a search field.

24. The computer system of claim 23 wherein said hierarchical database schema report identifies at least one field as a primary key field.

25. An article of manufacture for use in a computer system tangibly embodying computer instructions executable by said computer system to perform process steps for automatically, generating a hierarchical database schema report to facilitate writing application code for accessing a hierarchical database, said process steps comprising:

(a) accessing a database definition;

(b) accessing a logical database view;

(c) accessing an extended geld definition;

(d) accessing control statement information;

(e) building an in-memory representation of selective information obtained from steps (a) through (d) to automatically generate and customize a class for use by an object oriented programming language to access said hierarchical database; and (f) automatically generating said hierarchical database schema report utilizing said in-memory representation wherein said hierarchical database schema report may be utilized to write said application code to access said hierarchical database without further need to use said database definition, said extended field definition, said logical database view or any combination thereof wherein said hierarchical database schema report comprises at least one concatenated segment from a logical hierarchy wherein said concatenated segment comprises data from two or more underlying physical segments.

26. The article of manufacture of claim 25 wherein said object oriented programming language is Java.

27. The article of manufacture of claim 25 further comprising using said in-memory representation to generate an XMI stream of metadata that defines said class wherein said XMI stream may be used to regenerate said class in a new form as required by an application program.

28. The article of manufacture claim 25 wherein said hierarchical database is an IMS database.

29. The article of manufacture of claim 28 wherein said database definition is a DBD.

30. The article of manufacture of claim 29 wherein said logical database view is a PSB.

31. The article of manufacture of claim 25 wherein said database definition, said logical database view and said extended field definition comprise one or more database definitions, logical database views and extended field definitions, respectively.

32. The article of manufacture of claim 25 wherein said extended field definition comprises a COBOL copybook.

33. The article of manufacture of claim 32 wherein said COBOL copybook is in the form of an XMI metadata stream.

34. The article of manufacture of claim 25 wherein said hierarchical database schema report identifies at least one field as a secondary key field.

35. The article of manufacture of claim 25 wherein said hierarchical database schema report identifies at least one field as a search field.

36. The article of manufacture of claim 35 wherein said hierarchical database schema report identifies at least one field as a primary key field.

* * * * *

UNITED STATES PATENT AND TRADEMARK OFFICE

CERTIFICATE OF CORRECTION

PATENT NO. : 6,980,995 B2 
DATED : December 27, 2005
INVENTOR(S) : Kyle J. Charlet et al.

It is certified that error appears in the above-identified patent and that said Letters Patent is hereby corrected as shown below:

Column 1,
Line 41, delete "LMS" and replace with -- IMS --.

Column 2,
Line 50, delete "then" and replace with -- the --.
Line 58, delete "d(o", and replace with -- do --.

Column 4,
Line 35, delete "dulling" and replace with -- during --.

Signed and Sealed this

Twenty-first Day of February, 2006

JON W. DUDAS
*Director of the United States Patent and Trademark Office*